(12) United States Patent
Meyers et al.

(10) Patent No.: US 7,515,091 B2
(45) Date of Patent: Apr. 7, 2009

(54) METHOD AND SYSTEM FOR COMMUNICATING USING PULSED RADAR SIGNAL DATA LINKS

(75) Inventors: David W. Meyers, Brooklyn Park, MN (US); Michael R. Franceschini, Centerport, NY (US); James A. Freebersyser, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 86 days.

(21) Appl. No.: 11/837,819

(22) Filed: Aug. 13, 2007

(65) Prior Publication Data

US 2009/0045997 A1 Feb. 19, 2009

(51) Int. Cl.
*G01S 13/86* (2006.01)
(52) U.S. Cl. .............................. 342/57; 342/58; 342/59; 342/60
(58) Field of Classification Search ............. 342/57–60, 342/52
See application file for complete search history.

(56) References Cited

U.S. PATENT DOCUMENTS

| | | | |
|---|---|---|---|
| 5,809,060 A | 9/1998 | Cafarella et al. | |
| 5,866,838 A | 2/1999 | Mayersak | |
| 6,069,584 A | 5/2000 | Johnson | |
| 6,520,448 B1 | 2/2003 | Doty et al. | |
| 7,183,967 B1 | 2/2007 | Haendel et al. | |
| 7,298,312 B2 * | 11/2007 | McLemore | 342/45 |
| 7,339,955 B2 * | 3/2008 | Lakkis | 370/498 |
| 7,403,576 B2 * | 7/2008 | Lakkis | 375/316 |
| 2003/0161411 A1 * | 8/2003 | McCorkle et al. | 375/295 |
| 2005/0100077 A1 | 5/2005 | Rosen et al. | |
| 2006/0103535 A1 * | 5/2006 | Pahlaven et al. | 340/572.1 |
| 2007/0139253 A1 * | 6/2007 | Meyers et al. | 342/57 |
| 2008/0103645 A1 * | 5/2008 | DeMers et al. | 701/14 |

OTHER PUBLICATIONS

Dillard, George M. et al., "Cyclic Code Shift Keying: A Low Probability of Intercept Communication Technique", "IEEE Transactions on Aerospace and Electronic Systems", Jul. 2003, pp. 786-798, vol. 39, No. 3, Publisher: IEEE.
Singh, Prashant, "Direct-Sequence Spread Spectrum With Cyclic Code Shift Keying", Jun. 25, 2007, pp. 1-6, Publisher: http://www.clemson.edu/sure/2002/prash/report.html.

* cited by examiner

*Primary Examiner*—John B Sotomayor
(74) *Attorney, Agent, or Firm*—Fogg & Powers LLC

(57) ABSTRACT

A method and system for communicating using pulsed radar signal data links is disclosed. The method comprises encoding downlink data with a signature sequence as a secondary function onto a continuous wave pulse signal having a primary function at a master device. The data-encoded pulse signal from the master device is interpreted at one or more slave devices configured to receive the pulse signal within a first communications bandwidth of the primary and secondary functions. The master device synchronizes returning communication transmissions from each of the one or more slave devices for the secondary function within a prescribed return interval of the primary function.

20 Claims, 5 Drawing Sheets

METHOD AND SYSTEM FOR COMMUNICATING USING PULSED RADAR SIGNAL DATA LINKS

This application is related to commonly assigned U.S. patent application Ser. No. 11/552,372, filed on Oct. 24, 2006 and entitled "METHODS AND SYSTEMS FOR USING PULSED RADAR FOR COMMUNICATIONS TRANSPARENT TO RADAR FUNCTION" (the '372 application). The '372 application is incorporated herein by reference.

BACKGROUND

Devices such as pulsed radars are traditionally used for a variety of range and direction sensing applications including target detection and tracking, surveillance, weather monitoring, actuator positioning, and other applications. In known applications where pulsed radars are utilized, radar functions and communications functions are performed by separate transmitting and receiving devices. While radars and communications equipment incorporate transmitting and receiving devices, they are typically operated in separate frequency bands, each including separate antenna systems.

A pulsed radar typically has a small transmit duty cycle. In certain applications, the duty cycle of the pulsed radar is small so that the radar function is mostly off and the transmitter is idle, thereby allowing potential use for other communications functions during this idle time. The off-state of the radar function produces a window of opportunity for the radar to be used for different functions. For example, communication data can be encoded on the same pulse signal as the radar function during the off-state with a potentially tolerable level of co-existence. The two states utilize the same equipment but operate in separate divisions (for example, time, frequency, or code). To date, attempts in matching the two states to co-exist as a data link between at least two devices adds significant latency to a communication cycle.

For the reasons stated above and for other reasons stated below which will become apparent to those skilled in the art upon reading and understanding the present specification, there is a need in the art for improvements in communicating using pulsed radar signal data links.

SUMMARY

The following specification discloses a method and system for communicating using pulsed radar signal data links. The method comprises encoding downlink data with a signature sequence as a secondary function onto a continuous wave pulse signal having a primary function at a master device. The data-encoded pulse signal from the master device is interpreted at one or more slave devices configured to receive the pulse signal within a first communications bandwidth of the primary and secondary functions. The master device synchronizes returning communication transmissions from each of the one or more slave devices for the secondary function within a prescribed return interval of the primary function.

DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to a method and system for using pulsed radar signal data links to carry communications data on a pulsed radar signal to and from a radar altimeter and similar continuous wave devices. Examples of the pulsed radar signals include, but are not limited to, radio and radar altimeter signals to and from an aircraft, tracking radar signals to and from a ground controller, or continuous wave pulses from a millimeter wave imager. The data links described here involve multi-user detection techniques which synchronize simultaneous data-encoded pulse signals from a plurality of slave signal sources. Moreover, the data links described here utilize a cellular-like architecture with at least one master unit in communication with one or more mobile (slave) units. The master unit acts as a scheduler of the data-encoded pulse signals to and from the slave units.

In one implementation, modified existing pulsed, continuous-wave radar altimeter waveforms carry the data-encoded pulse signals to provide command and control data to the one or more slave units. For example, a slave-initiated uplink pulse from a slave radar altimeter device carries messages back to the master device. Applying multi-user detection techniques on a modified master unit separates overlapped data-encoded return pulse signals. The modified waveforms from the master unit are scalable to communicate with an increasing number of the one or more slave units while retaining low latency control loops. As contemplated in the '372 application, the modified waveforms operate simultaneously within the same frequency band for both the radar altimeter functionality and the data link, referred to herein as 'frequency band re-harvesting.' For example, at least one master data link described here will instruct each of the one or more slave units to alter a flight pattern to acquire at least one target during the off-state of the radar altimeter function. Moreover, the data links discussed here further comprise live streaming position information of each of the one or more slave units, with optional imagery and video capture to simplify and shorten master/slave communication cycles.

Figure 1:
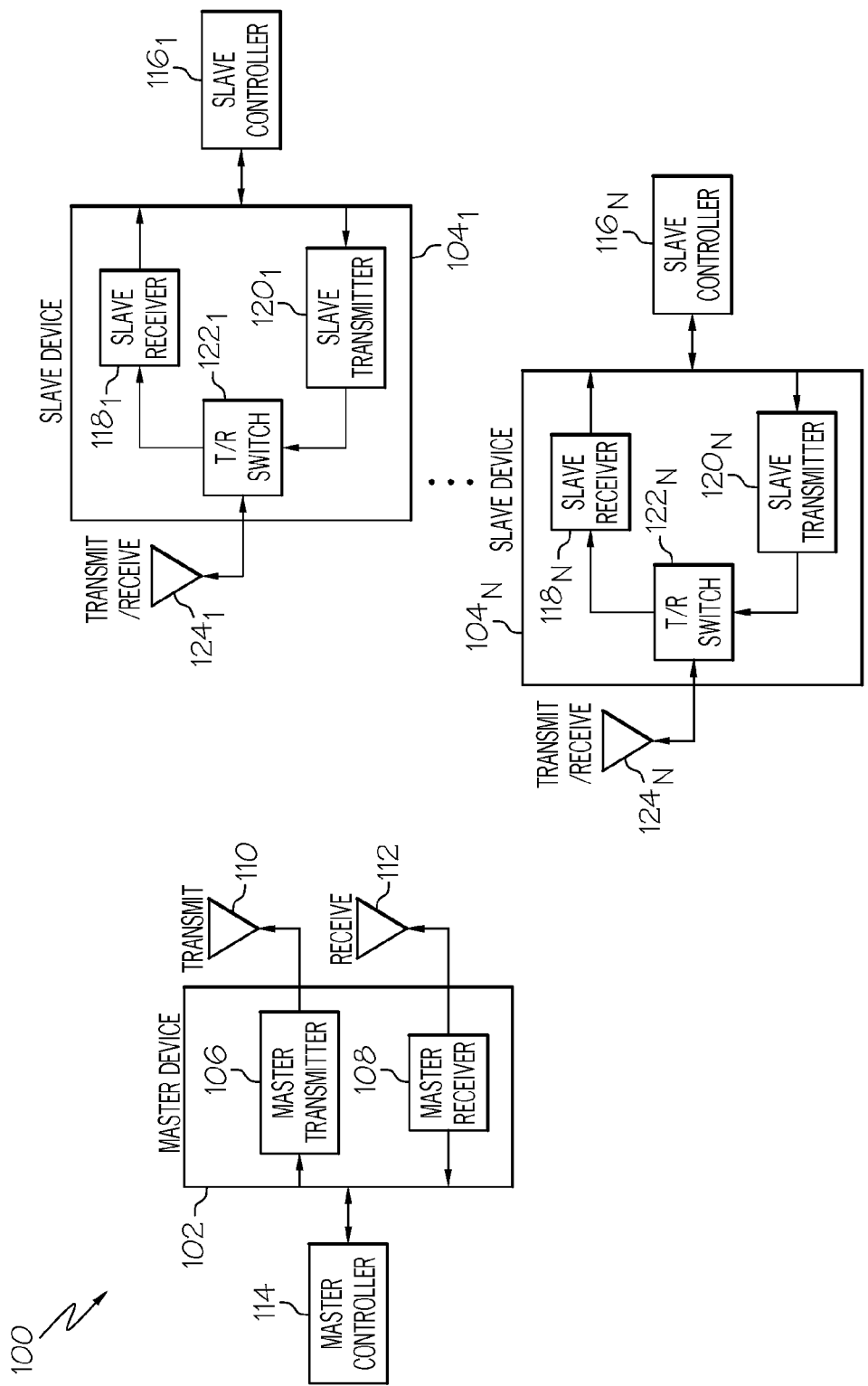
FIG. 1 is a block diagram of a system for communicating using a pulsed radar signal data link.

FIG. 1 is a system 100 for communicating with a pulsed radar signal data link. The system 100 comprises a master device 102 and a plurality of slave devices $104_1$ to $104_N$. In the example embodiment of FIG. 1, the master device 102 comprises, without limitation, an aircraft, a radar altimeter mounted on the aircraft, a ground controller, or a millimeter wave imager. The master device 102 further comprises a master transmitter 106 and a master receiver 108, with the master transmitter 106 and the master receiver 108 communicatively coupled to a master controller 114 as shown in FIG. 1. In addition, the master device 102 includes a transmit antenna 110 responsive to the master transmitter 106, and a receive antenna 112 responsive to the master receiver 108. In the illustrated embodiment of FIG. 1, the master transmitter 106 is configured as a pulsed radar transmitter and the master receiver 108 is configured as a continuous wave receiver. The master controller 114 is a source of the datalink to and from each of the slave devices 104. Examples of the slave devices 104 include, but are not limited to, programmable guided munitions, mobile communications devices, distributed radar tracking sensors, or millimeter wave imaging sensors.

Each of the slave devices 104 comprise a slave receiver 118 and a slave transmitter 120 communicatively coupled to a transmit/receive (T/R) switch 122, with the T/R switch 122 responsive to a T/R antenna 124. The slave receiver 118 and the slave transmitter 120 are further communicatively coupled to a slave controller 116. In the illustrated embodiment, each of the slave transmitters $120_1$ to $120_N$ is configured as a continuous wave transmitter, and each of the slave receivers $118_1$ to $118_N$ is configured as a pulsed radar receiver. It is understood that the system 100 is capable of accommodating any appropriate number of master devices 102 (as described above) and slave devices $104_1$ to $104_N$ configured as shown in FIG. 1 with the slave receivers $118_1$ to $118_N$, the slave transmitters $120_1$ to $120_N$, the T/R switches $122_1$ to $122_N$, and the T/R antennas $124_1$ to $124_N$ in a single system 100. In the example embodiment of FIG. 1, a direct-sequence spread spectrum (DSSS) waveform of up to 24 dB of processing gain (PG) is incorporated with a pulsed radar bandwidth of at least 30 MHz to accommodate the desired number of data link frame pulses. It is understood that in alternate implementations, alternate PG values and alternate pulsed radar bandwidth values with the pulsed radar data link architecture discussed here are possible.

In operation, the master transmitter 106 accepts a first set of protocol data unit (PDU) data from the master controller 114, performs forward error correction (FEC) on the first set of PDU data, and interleaves the first set of PDU data received from the master controller 114 within a first pulsed radar signal of a radar altimeter function of the master device 102. For purposes of this description, the term PDU is interpreted to mean information that is delivered as a data unit among peer entities of a network and contains control information, address information, or data. In one implementation, Reed-Solomon FEC is used for any possible recovery of lost pulses and to avoid any potential PDU data collisions. The master device 102 transmits the data-encoded pulses as a secondary function of the first pulsed radar signal through the transmit antenna 110 using multi-dimensional signal pulse modulation (MDSPM), as described below with respect to FIGS. 2 and 3, to encode the first set of PDU data with a signature sequence onto the first pulsed radar signal.

In one implementation, at least one of the slave receivers 118 intended to receive the encoded PDU data (for example, the slave receiver $118_1$) uses cyclic code shift keying (CCSK) to demodulate MDSPM-modulated pulses received via the corresponding T/R antenna 124 (for example, the T/R antenna $124_1$), decodes the FEC on the first set of encoded PDU data, and de-interleaves the (now-decoded) first set of PDU data. Each of the slave receivers 118 configured to interpret the signature sequence send the first set of PDU data to the corresponding slave controller 116 (for example, the slave controller $116_1$) for processing.

Continuing with the above example, the slave transmitter $120_1$ accepts a second set of PDU data (for example, uplink data) from the slave controller $116_1$ and performs FEC on the uplink data for transmission within at least one return pulse interval of the first pulsed radar signal. The slave transmitter $120_1$ interleaves the uplink data within the first pulsed radar signal in accordance with synchronization command and control rules from the master device 102 to avoid any overlap interference with the return pulse interval of the radar altimeter function. The slave transmitter $120_1$ modulates each return pulse interval of the first pulsed radar signal as at least a portion of a continuous wave signal using CCSK for transmission through the T/R switch 122, and the T/R antenna $124_1$. At the master device 102, the master receiver 108 uses CCSK to de-modulate the uplink data received via the receive antenna 112. The master receiver 108 decodes the FEC and de-interleaves the uplink data. The de-interleaved uplink data is then sent to the master controller 114 for processing.

In the example embodiment of FIG. 1, the radar pulses transmitted by the master device 102 are partitioned into a scalable data uplink for each of the slave devices 104 in the system 100. The master receiver 108 synchronizes the uplink data transmissions from each of the slave devices 104 within the least one return pulse interval of the first pulsed radar signal. In one embodiment, the scalable data uplink comprises a multiple-pulse waveform with code-division multiple access (CDMA) and multi-user detection (MUD). As the number of slave devices 104 increase, the scalable data uplink maintains a substantially constant power level at the master device 102 regardless of the number of the slave devices 104 joining the system 100.

The system 100 shown in FIG. 1 is considered a centralized cellular-like master/slave architecture. To achieve this, a principal media access control (MAC) within the master controller 114 and each of the slave controllers 116 comprise a master-slave polling routine, synchronized to an altimeter pulse return interval (PRI) as described below with respect to FIGS. 2 and 3. The slave devices 104 comprise transmission reply delays that synchronize to the PRI of the master device 102. Moreover, each of the transmission reply delays will prevent any interference overlap between pulsed radar return signals and uplink responses from the slave device 104. In one implementation, the principal MAC of the system 100 supports one or more slave devices 104 simultaneously per master device 102. To achieve the simultaneous support described here, an expansion MAC of the master controller 114 and the slave controllers 116 use CDMA with a MUD enhancement that supports scalability by separating multiple slave device signals at the master device 102 after the PRI (of the master device 102) is filled. Moreover, the system 100 maintains a constant received power level at the master receiver 108 by scaling any overlapping uplink pulses from the slave devices 104. Further details with respect to the scalability of the system 100 are further discussed below with respect to FIGS. 2 and 3.

The multi-user detection (MUD) portion of the expansion MAC at the master device 102 transmits power control between each of the slave devices 104. The MUD feature maintains a substantially constant received power (for example, less than 3 dB imbalance) at the master device 102 for each of the slave devices 104. In at least one implementation, an adaptive symbol non-coherent integration (NCI) rate is provided for any possible range extensions of the system 100. For example, managing the adaptive NCI rate at the master controller 114 provides an aircraft employing the system 100 to handle various aircraft dynamics and orientation effects during maneuvers, as further illustrated below with respect to FIG. 4.

Figure 2:
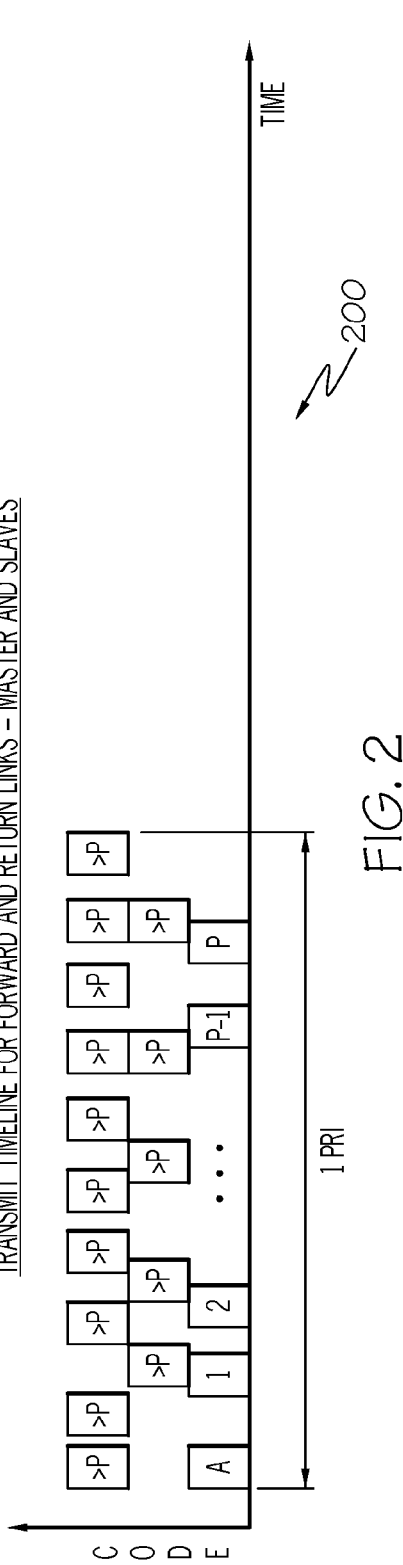
FIGS. 2 and 3 are timing diagrams of multi-dimensional signal pulse modulation (MDSPM) transmit and receive signals.
Figure 3:
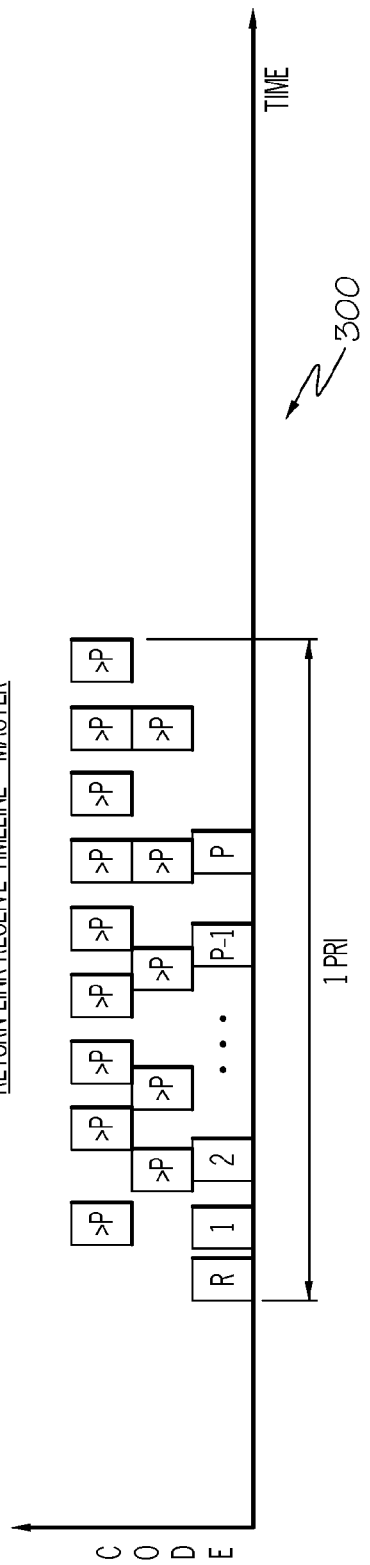

FIG. 2 is an overall timing diagram of MDSPM forward and return link transmissions. FIG. 3 is a timing diagram of receiving an MDSPM return link transmission. In the example embodiment of FIG. 2, the MDSPM signal 200 comprises a multi-frame structure of 255 cycles of the radar altimeter PRI. Each radar altimeter PRI carries 1 downlink pulse per master device (shown in FIG. 2 as frame 'A') and 'P' uplink frame "slots" as shown in FIGS. 2 and 3. In one implementation, the radar altimeter PRI is 72.2 µs, and each frame is 18.411 ms, where a round-trip delay is 40 ms with a 3 ms process delay. For example, a single frame will carry 255*8, or 2040 bits of raw data, and 191*8, 1528 bits of payload data, depending on the amount of forward error correction desired. Using the above example, in a 225 bit tactical digital information link (TADIL)-J message, there will be at least seven TADIL-J downlink messages per frame. Moreover, with at least 55 frames/sec, there will be at least 310 updates/sec of the downlink message available.

In this example embodiment, to join a network of radar transmitters and receivers incorporating the MDSPM forward and return links described here, a transmitting device utilizes one of a small number of common code patterns which all receiving devices within a network monitor (for example, common code patterns used in a CDMA implementation). In one implementation, to increase the overall probability that a new user (for example, a new radar transmitter incorporating CDMA with MUD) can join the network, the radar transmitters and receivers within the network implement a switch to a different networking join code pattern or a frequency change. As discussed above with respect to FIG. 1, each uplink slot supports multiple CDMA pulses from multiple master devices in overlapping "cells." In at least one alternate implementation, frequency-division multiple-access (FDMA) can be used to isolate the overlapping "cells" of the multiple master devices. If any of the multiple master devices are authorized to communicate with the slave devices, control can be allocated to at least one of the authorized master devices. In one implementation, the authorized master device in a first overlapping "cell" provides an affiliation signature for passing control of at least a portion of the slave devices in the first overlapping "cell" to the authorized master device.

The MDSPM signals discussed here illustrate an improved modulation approach to data link communications. For example, each transmit pulse can have an average duration of 7.68 μs. With reference to FIG. 1 above, the PDU data provided by the pulsed radar signals described here are modulated with 256-ary CCSK. For example, by using 256-ary CCSK, at least 256 chips are available at a 30 ns chip rate for a 33 MHz signal bandwidth. The 256-ary CCSK approach is effectively a M-ary pulse position modulation (PPM), as described in the '372 application, with 256 unique code words and without dead times. If the forward error correction is not included in each pulse transmission, the CCSK modulation will provide eight bits of data per pulse. In at least one alternate embodiment, a lower-order 32-ary CCSK may be employed at low altitudes (for example, for shorter pulses of 960 ns and an altitude coverage of at least 473 feet).

As described above with respect to FIG. 1, each of the slave devices 104 transmits synchronous uplink CCSK pulses. The downlink data directs the uplink reply delay period for each of the slave devices 104. The uplink reply pulse slots can overlap the downlink pulse from the master device 102 since the master receiver 108 is a full duplex receiver. However, as shown in FIG. 3, all of the 'P' uplink frames fit into the PRI window so as to not overlap at the radar altimeter return frame 'R' of the master receiver 108. This ensures no degradation to altimeter functionality. In one implementation, each downlink supports P=1−(1/duty cycle) orthogonal reply pulse slots.

Any of the slave devices 104 can transmit up to P uplink reply pulse slots in a low duty cycle PRI. For more than P uplink reply pulse slots per PRI, the reply slots are stacked using CDMA. In this example embodiment, stacking of the orthogonal reply slots substantially increases the uplink capacity. In one implementation, the increased uplink capacity is capable of transmitting at least a 1 Mbps video stream. The return uplink discussed here and as shown in FIG. 3 uses the same preferred DSSS/CCSK modulation as the downlink discussed above with respect to FIG. 2. The preferred DSSS/CCSK modulation allows for a plurality of simultaneous users, and is considered a "scalable" uplink. The "scalable" uplink supports a plurality of slave devices 104 for every master device 102. In the example embodiments of FIGS. 2 and 3, the scalability of the uplink is controlled by the master controller 114. Moreover, the master controller 114 separates the multiple continuous wave signals received by the pulsed radar altimeter without inhibiting the radar sensing function of the radar.

The above described embodiments result in a method for using outgoing transmissions of a pulsed radar for data communications in a manner that is simultaneous, transparent, non-disruptive, and non-interfering to the (primary) radar transmission function of the transmitting radar and to the (primary) radar sensing function of the receiving radar. Moreover, the above described embodiments can be utilized in a number of applications. In one particular embodiment, an aircraft-based radar altimeter transmission including the data communications are utilized to provide re-targeting data to precision guided munitions (PGMs) that may have been launched from the aircraft. The methods described here provide a new capability for surface attack with PGMs by providing the ability to re-target GPS-guided PGMs in flight to hit moving targets. Streaming current position information provides an impact point of each PGM so that bomb damage assessment (BDA) is done in real-time, which simplifies and shortens any re-targeting cycle. Synchronization of each uplink message from the PGMs ensures non-interference with altimeter functionality.

Figure 4:
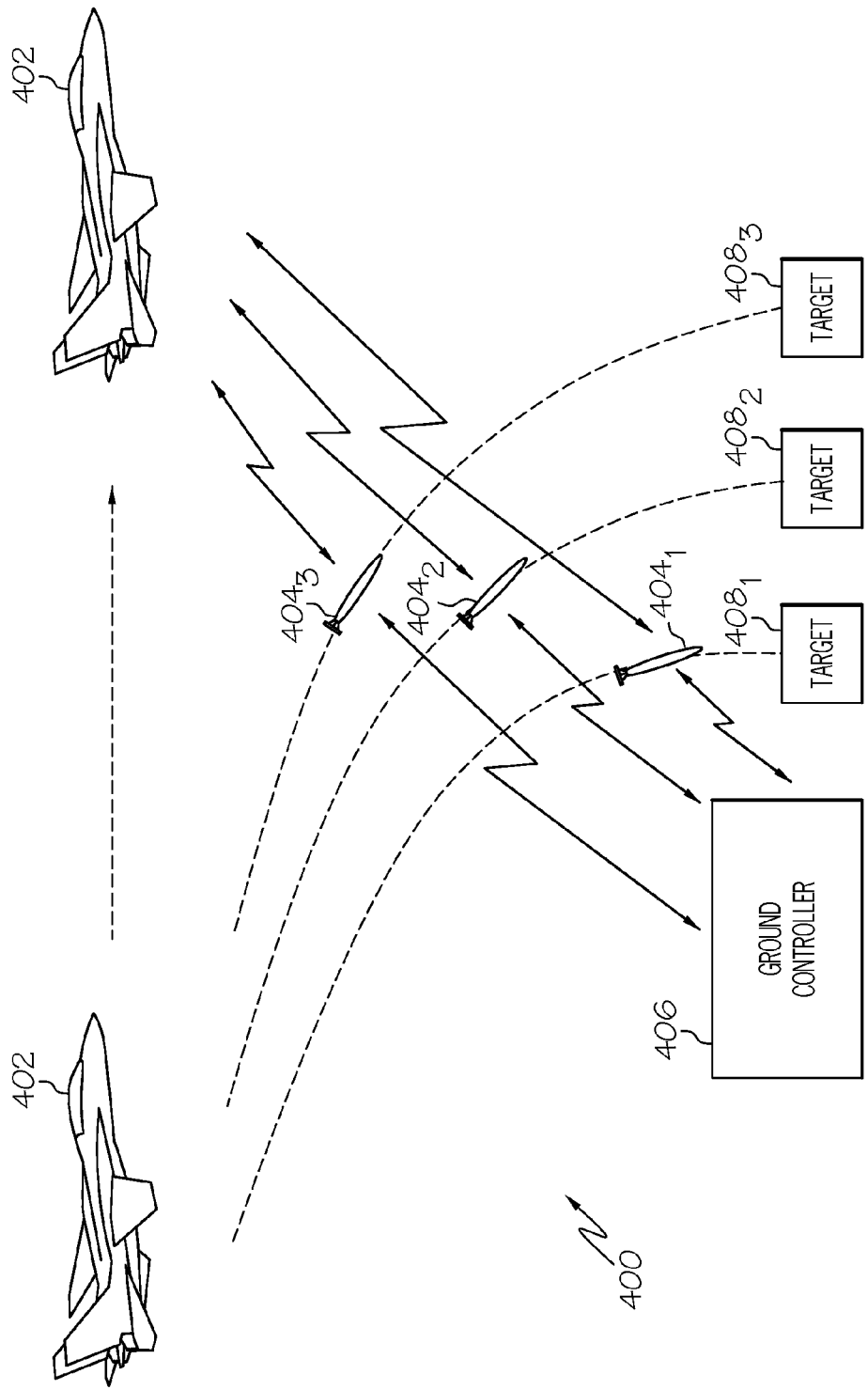
FIG. 4 is an illustration of an exemplary master device communicating with one or more slave devices using a pulsed radar signal data link.

FIG. 4 illustrates utilization of radar altimeter waveforms to provide re-targeting data to PGMs using multi-dimensional signal pulse modulation (MDSPM). In one embodiment, a radar altimeter is integrated with a targeting computer of an aircraft 402. The radar altimeter of the aircraft 402 is modified to transmit MDSPM data, primarily target position updates, to PGMs $404_1$ to $404_3$ as a secondary function of the radar altimeter waveforms. The radar altimeter of the aircraft 402 is further modified to receive MDSPM data from the PGMs 404 which includes at least one of a status and a location indication of each of the PGMs 404. Alternatively, a ground controller 406 will transmit (receive) MDSPM data to (from) each of the PGMs 404. Referring to the descriptions above, the slot in which each of the respective PGMs $404_1$ to $404_3$ receives the transmitted MDSPM radar pulse from the aircraft 402 or the ground controller 406 is interpreted as a command to adjust the descent for any of the PGMs 404. Each different slot corresponds to a different adjustment in descent. Similarly, each of the PGMs 404 provide positioning updates to the aircraft 402 or ground controller 406 based on which slot a MDSPM radar pulse transmitted by the respective PGM 404 is received by the aircraft 402 or the ground controller 406. As each of the PGMs 404 progress further from the aircraft 402 or the ground controller 406, the transmit power of each of the PGMs 404 is increased. The transmit power is increased as a function of time after release to provide a substantially constant and balanced received power level at the aircraft 402 or the ground controller 406 from all the released PGMs. In a specific embodiment, a received power difference for all PGMs providing position updates to the aircraft 402 or the ground controller 406 is less than 3 dB.

The example embodiment of FIG. 4 uses a direct-sequence spread spectrum (DSSS) radar altimeter waveform to encode pulsed radar signals with data using cyclic code shift keying (CCSK). The aircraft 402 and the ground controller 406 uses the encoded data to re-target, control, and track each of the PGMs 404₁ to 404₃ to targets 408₁ to 408₃ as shown in FIG. 4. In one implementation, at least 370 command and control messages are available for distribution between each of the PGMs 404, including the NCI signal enhancements (discussed above with respect to FIG. 1) to substantially cover data link ranges for each of the PGMs 404₁ to 404₃ to acquire the targets 408₁ to 408₃. In the same implementation, the DSSS radar altimeter waveform from the aircraft 402 has a downlink rate of 83 Kbps. Each of the PGMs 404₁ to 404₃ uplinks the CCSK encoded data, slaved to downlink timing, with updated position and status to a single master (for example, at least one of the aircraft 402 and the ground controller 406) at up to 750 Kbps. It is understood that in alternate implementations, alternate uplink and downlink data link rates are possible with the example embodiment discussed above with respect to FIG. 4.

Figure 5:
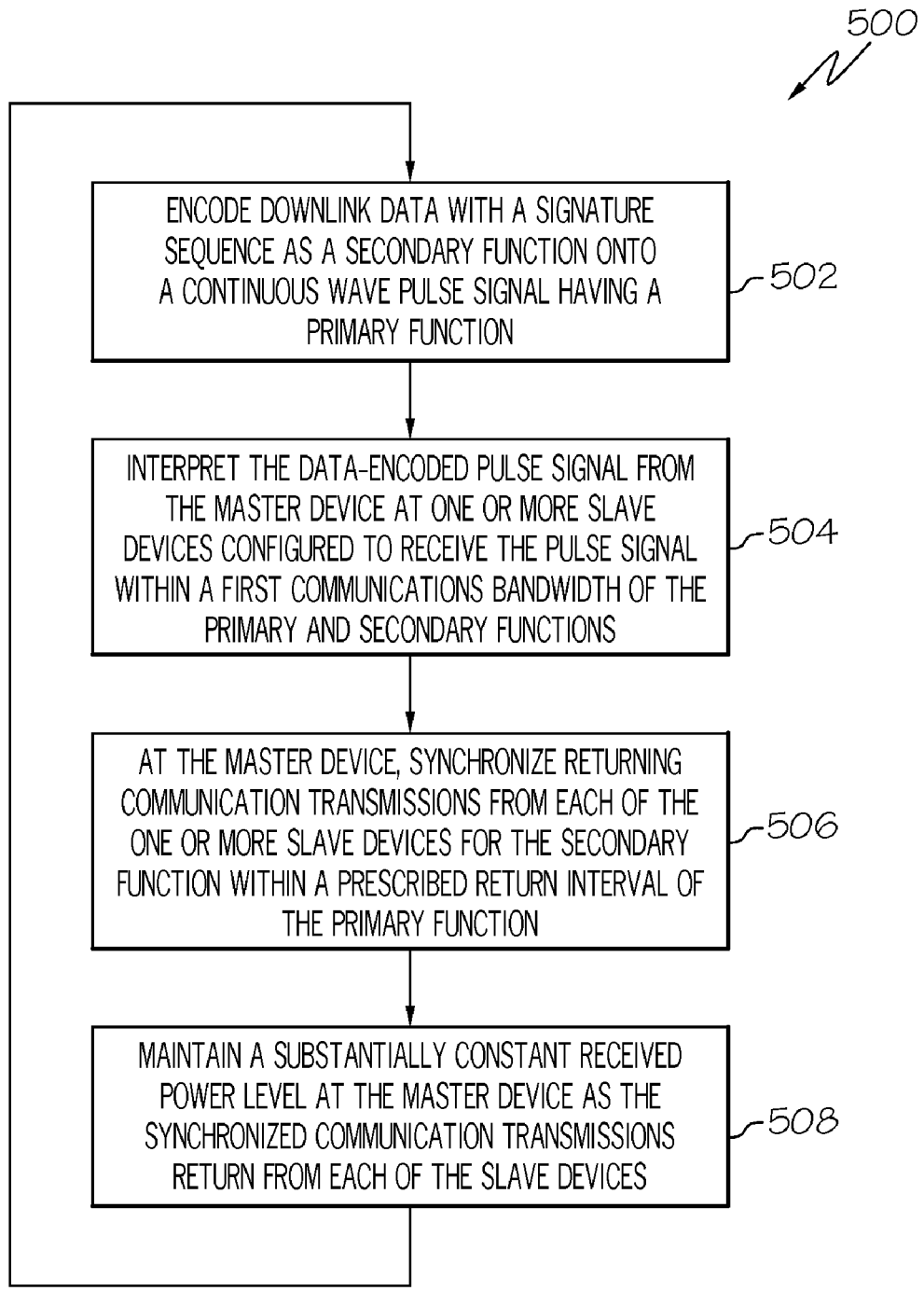
FIG. 5 is a flow diagram of a method for communicating using a pulsed radar signal data link.

FIG. 5 is a flow diagram of a method 500 for communicating using a pulsed radar signal data link in the centralized cellular-like master/slave architecture similar to that of FIGS. 1 and 4. The method of FIG. 5 addresses encoding downlink data with a signature sequence as a secondary function onto a continuous wave pulse signal (for example, the DSSS radar altimeter waveform of FIG. 4) having a primary function at a master device (block 502). In addition, the method of FIG. 5 allocates control of the one or more slave devices to at least one additional master device authorized to communicate with the one or more slave devices by providing an affiliation signature for passing control of at least a portion of the one or more slave devices in a first area from a first master device to a second master device and sends the affiliation signature through external master-to-master communications (as discussed above with respect to FIG. 4). Further, the data-encoded pulse signal can be used to instruct at least one of the one or more slave devices to alter a flight pattern to acquire a target.

In one implementation, the master device performs forward error correction on the downlink data and modulates the corrected downlink data with the signature sequence prior to transmission of the continuous wave pulse signal. To interpret the data-encoded pulse signal from the master device, one or more slave devices are configured to receive the pulse signal within a first communications bandwidth of the primary and secondary functions (block 504). In one implementation, the one or more slave devices demodulate and decode the signal using CCSK to interpret the signature sequence, and interleave the returning uplink data from the one or more slave devices on the pulse signal for use by the master device. The returning communication transmissions from each of the one or more slave devices are synchronized for the secondary function at the master device within a prescribed return interval (for example, the PRI shown in FIGS. 2 and 3) of the primary function (block 506). As the synchronized communication transmissions return from each of the slave devices, a substantially constant received power level is maintained at the master device (block 508).

Figure 6:
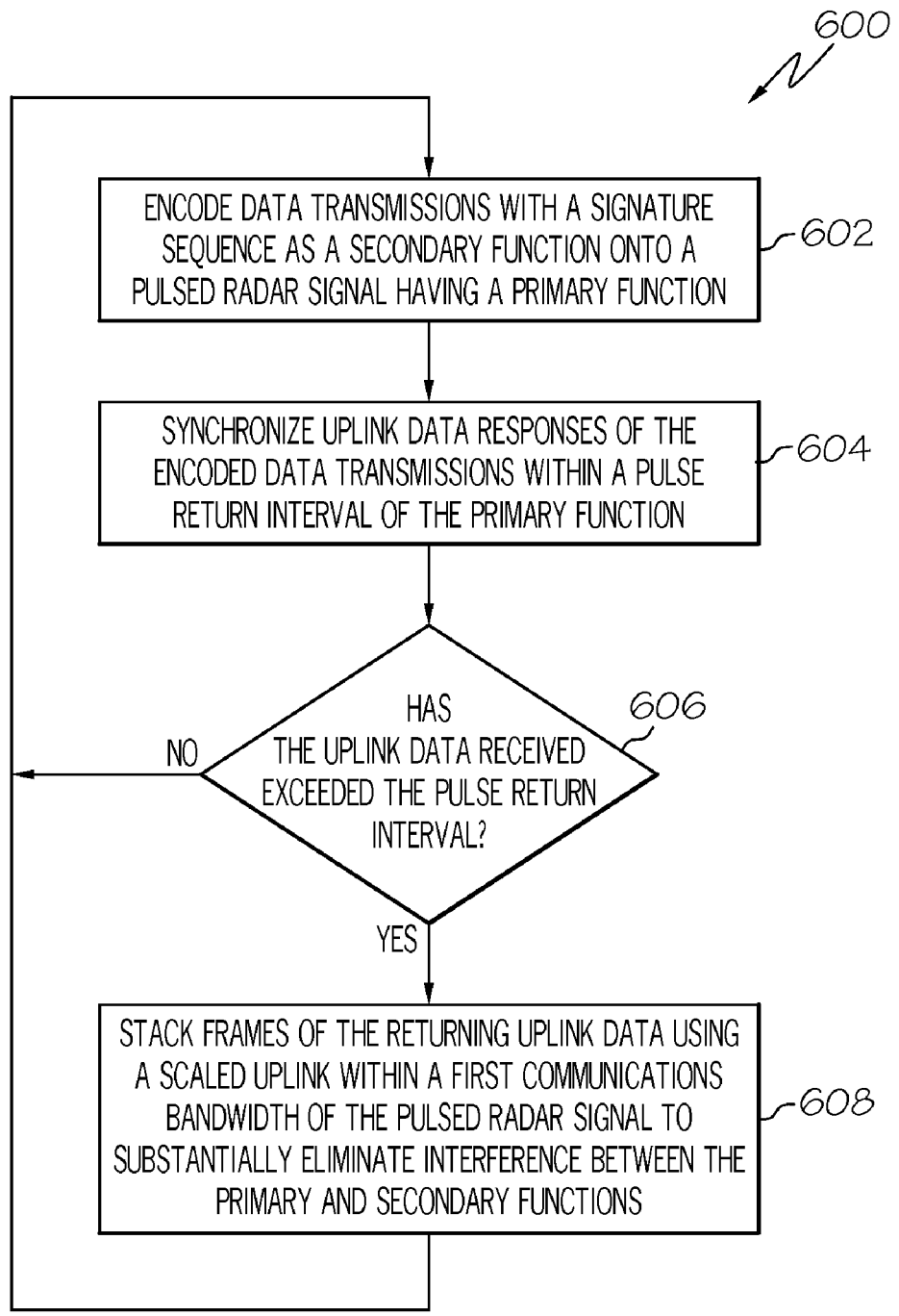
FIG. 6 is a flow diagram of another method for communicating using a pulsed radar signal data link.

FIG. 6 is a flow diagram of a method 600 for communicating using a pulsed radar signal data link. For example, at least one implementation of the method of FIG. 6 addresses synchronizing data communication transmissions from a plurality of slave devices in FIGS. 1 and 4 to ensure that return uplink data arrives within a pulse return interval of a primary function (for example, a pulsed radar signal from a radar altimeter or tracking radar) without overlapping at a master device. In the method 600, the master device encodes data transmissions with a signature sequence as a secondary function onto the pulsed radar signal having the primary function (block 602). In one implementation, the device performs forward error correction on the data and modulates the corrected data with the signature sequence prior to transmission of the pulsed radar signal.

To synchronize uplink data responses of the encoded data transmissions within the pulse return interval of the primary function (block 604), the pulsed radar signal data link arranges the returning uplink data into orthogonal reply slots, wherein a first portion of the reply slots is allocated for a first receiver slot of the master device. Further, the pulsed radar signal data link maintains a substantially constant received power level at the master device, similar to the CDMA with multi-user detection arrangement discussed above for the system 100. As additional uplink data are received and begin to exceed the pulse return interval (block 606), the pulsed radar signal data link of FIG. 6 stacks frames of the returning uplink data using a scaled uplink within the first communications bandwidth of the pulsed radar signal (block 608). In one implementation, the pulsed radar signal data link separates each of the encoded data frames to detect one or more sources of each of the additional uplink data with multi-user detection. The frame stacking discussed here substantially eliminates interference between the primary and secondary functions of the pulsed radar signal such that the primary and secondary functions operate simultaneously within the same frequency band for both the radar altimeter functionality and the data link.

While the embodiments disclosed have been described in the context of a pulsed radar system providing pulsed radar signal data links, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired or wireless communications links using transmission forms, such as radio frequency and light wave transmissions. The variety of program products may take the form of coded formats that are decoded for actual use in a particular pulsed radar system providing pulsed radar signal data links by a combination of digital electronic circuitry and software (or firmware) residing in a programmable processor (for example, a special-purpose processor or a general-purpose processor in a computer).

At least one embodiment disclosed herein can be implemented by computer-executable instructions, such as program product modules, which are executed by the programmable processor. Generally, the program product modules include routines, programs, objects, data components, data structures, and algorithms that perform particular tasks or implement particular abstract data types. The computer-executable instructions, the associated data structures, and the program product modules represent examples of executing the embodiments disclosed.

This description has been presented for purposes of illustration, and is not intended to be exhaustive or limited to the embodiments disclosed. Variations and modifications may occur, which fall within the scope of the following claims.

What is claimed is:

1. A method for communicating using a pulsed radar signal data link, the method comprising:
   encoding downlink data with a signature sequence as a secondary function onto a continuous wave pulse signal having a primary function at a master device;
   interpreting the data-encoded pulse signal from the master device at one or more slave devices configured to receive the pulse signal within a first communications bandwidth of the primary and secondary functions; and
   synchronizing returning communication transmissions from each of the one or more slave devices for the secondary function at the master device within a prescribed return interval of the primary function.

2. The method of claim 1, further comprising:
   allocating control of the one or more slave devices to at least one additional master device authorized to communicate with the one or more slave devices; and
   maintaining a substantially constant received power level at the master device as the synchronized communication transmissions return from each of the slave devices.

3. The method of claim 2, wherein allocating control of the one or more slave devices comprises:
   providing an affiliation signature for passing control of at least a portion of the one or more slave devices in a first area from a first master device to a second master device; and
   sending the affiliation signature through external master-to-master communications.

4. The method of claim 1, further comprising using the data-encoded pulse signal to instruct at least one of the one or more slave devices to alter a flight pattern to acquire a target.

5. The method of claim 1, wherein encoding the downlink data further comprises:
   performing forward error correction on the downlink data; and
   modulating the corrected downlink data with the signature sequence prior to transmission of the continuous wave pulse signal.

6. The method of claim 1, wherein interpreting the data-encoded pulse signal from the master device at the one or more slave devices comprises:
   demodulating and decoding the signal using cyclic code shift keying to interpret the signature sequence; and
   interleaving returning uplink data from the one or more slave devices on the pulse signal for use by the master device.

7. A computer-readable medium having executable instructions for performing a method for communicating using a pulsed radar signal data link according to claim 1.

8. A method for communicating using a pulsed radar signal data link, the method comprising:
   encoding data transmissions with a signature sequence as a secondary function onto a pulsed radar signal having a primary function;
   synchronizing uplink data responses of the encoded data transmissions within a pulse return interval of the primary function; and
   as returning uplink data are received that exceed the pulse return interval of the pulsed radar signal return, stacking frames of the returning uplink data using a scaled uplink within a first communications bandwidth of the pulsed radar signal to substantially eliminate interference between the primary and secondary functions.

9. The method of claim 8, wherein encoding the data transmissions further comprises:
   performing forward error correction on the data transmissions; and
   modulating the corrected data with the signature sequence prior to transmission of the pulsed radar signal.

10. The method of claim 8, wherein synchronizing the responses to the encoded data transmissions comprises:
    arranging the returning uplink data into orthogonal reply slots, wherein a first portion of the reply slots is allocated for a first receiver slot of a master device; and
    maintaining a substantially constant received power level at the master device.

11. The method of claim 8, wherein stacking the frames of the returning uplink data using the scaled uplink comprises separating each of the returning encoded data frames to detect one or more sources of the returning uplink data with multi-user detection.

12. A computer-readable medium having executable instructions for performing a method for communicating using a pulsed radar signal data link according to claim 8.

13. An electronic system, comprising:
    a master device, including:
      a master controller;
      a master transmitter communicatively coupled to the master controller, the master transmitter operable to transmit data-encoded pulses as downlink data having a signature sequence on a first pulsed radar signal; and
      a master receiver communicatively coupled to the master controller, the master receiver operable to synchronize uplink data received within at least one return pulse interval of the first pulsed radar signal;
    one or more slave devices, each of the slave devices including:
      a slave controller;
      a slave transmitter communicatively coupled to the slave controller, the slave transmitter operable to transmit at least a portion of the uplink data; and
      a slave receiver communicatively coupled to the slave controller, the slave receiver operable to receive the downlink data from the master device;
    wherein the master controller scales the first pulsed radar signal for receiving the uplink data from the one or more slave devices on a scaled data uplink within a first communications bandwidth; and
    wherein the master receiver detects each of the slave devices using the scaled data uplink to maintain a substantially constant received power level at the master device.

14. The system of claim 13, wherein the master device comprises an aircraft, a radar altimeter mounted on the aircraft, a tracking radar, a ground controller, or a millimeter wave imager.

15. The system of claim 13, wherein the master controller is operable to:
    use the encoded downlink data to instruct at least one of the one or more slave devices to alter a flight pattern to acquire a target; and
    manage communications signal enhancements to substantially cover data link ranges for each of the slave devices.

16. The system of claim 13, wherein the master controller is further operable to:
    provide an affiliation signature for passing control of at least a portion of the one or more slave devices in a first area from a first master device to a second master device; and
    send the affiliation signature through external master-to-master communications.

17. The system of claim 13, wherein the master transmitter is further operable to:
 perform forward error correction on the downlink data; and
 modulate the corrected downlink data with the signature sequence prior to transmission of the first pulsed radar signal.

18. The system of claim 13, wherein the one or more slave devices comprise a programmable guided munitions, mobile communications devices, distributed radar tracking sensors, or millimeter wave imaging sensors.

19. The system of claim 13, wherein each slave controller is configured to return streaming video images of a target impact point for real-time assessment.

20. The system of claim 13, wherein each slave receiver is further operable to:
 demodulate and decode the first pulsed radar signal using cyclic code shift keying to interpret the signature sequence.

* * * * *